2,758,368
Patented Aug. 14, 1956

2,758,368

METHOD OF MAKING COMPOSITE METAL BODIES OF DIFFERENT METALS

John B. Ulam, Bethel Township, Allegheny County, Pa.

No Drawing. Application September 11, 1951, Serial No. 246,153

6 Claims. (Cl. 29—471.5)

This invention relates generally to the method of preparing the assemblies of the metal pieces in the formation of the composite metal bodies and more particularly to the method of preventing the formation of oxides between the surfaces that are to be joined together in the process of forming a composite metal body.

The principal object of this invention is the provision of method steps for preparing composite metal bodies which are heated and then rolled to produce a composite metal strip. It is of prime importance that all forms of oxides be eliminated from between the surfaces of the metal layers which form the assemblies that are heated and rolled to produce composite metal bodies. There are many different processes for treating the metals in preparing such assemblies. Some processes employ the use of bonding agents between the surfaces to be joined. These agents are principally electrolytic, silver, iron or nickel. In my new bonding process I do not employ any agents but require that the adjacent surfaces be mechanically cleaned by the removal of the metal and placed in aligned relation. Regardless of which method is employed it is of prime importance to prevent oxidation.

The principal object of this invention is the provision of a method which avoids the formation of oxides on the surfaces of the metal prior to their being heated and worked in forming a composite metal body. The principal steps in preventing the formation of metal oxides on these surfaces are to make up the assembly by mechanically cleaning the metal pieces and then put these cleaned surfaces together in aligned relation and weld around the perimeter thereof which creates a chamber between the surfaces to be joined. This chamber is then exhausted by some means, such as a vacuum pump, and then is sealed off. It is preferable to exhaust the chamber at approximately one or two pounds of atmospheric pressure which is respectively 27.88 and 25.85 inches of mercury, although the higher the vacuum the less opportunity of the formation of oxides in a sealed chamber. Again, a small strip of aluminum, magnesium or zinc may be positioned at some convenient place within the sealed chamber by inserting a ribbon or wire in the seam before welding over the same. Such a metal ribbon or wire when subjected to the temperature required to form a composite of mild steel and stainless steel, or mild steel and copper, or stainless steel and copper, will disintegrate and form an oxide which consumes any free oxygen that would otherwise oxidize the surface of the metals making up the composite. The magnesium, zinc or aluminum has a greater affinity for the oxygen than the copper or the steel and, thus, would absorb any oxygen that was free or escaped into the exhausted chamber between the surfaces to be joined.

It is also within the scope of this invention to exhaust the chamber formed between the metal pieces that are stacked in the assembly and sealed across the same and then apply an inert gas, such as argon or any other suitable gas that may be inserted under pressure following the exhausting of the chamber, so that the pressure within the chamber is substantially equalized with the atmospheric presure or preferably a few pounds higher, such as 16 to 20 pounds per square inch. An equalization of the pressure in this manner prevents the formation of leaks when the assembly is heated and rolled.

Another mode of preparing the assemblies which comprises this invention is the steps of exhausting the chamber formed between the pieces that make up the assembly and then inserting oxygen consuming gas, such as hydrogen or helium, which gas may be supplied to the chamber under a pressure below or above atmospheric pressure in the same manner as the argon. Thus the hydrogen, helium, aluminum, magnesium or zinc function as agents to consume any oxygen with the chamber when the assembly is heated in preparation for forming the composite by applying pressure such as by rolling or it may be such as to prevent the formation of oxygen such as by filling the chamber with argon. It is true that none of these agents needs to be employed, if the chamber formed between the surfaces to be mated is exhausted to a very low pressure or a fairly good degree of vacuum. However the addition of the oxygen-consuming or inert gas agents provide an additional factor of safety preventing any oxidation between the surfaces, as the process of cladding metal wherein the assembled pieces are heated to the proper temperature and then pressed together as by rolling. A weld or bond between the adjacent metal surfaces in the composite will not be made if oxides have been permitted to grow on the surfaces, regardless of whether the composite metal is being made between mild steel and stainless or between any of these steels and copper or with aluminum, or between different kinds of aluminum being forged together, or in constructing a composite metal body when using nickel, titanium, molybdenum or other metals capable of being heated and welded together to form a composite.

Any of these four modes of preparing the assemblies may be followed in preventing the formation of oxides on the surfaces to be joined. The prepared and aligned surfaces of the assemblies form a part of the chamber which is exhausted by a vacuum pump and sealed ready for heating and rolling. The second mode requires the use of a ribbon or wire or any oxygen-absorbing material may be placed in the sealed and exhausted chamber of the assembly. The third mode is to exhaust the sealed chamber and add an inert gas thereto and the fourth mode is to exhaust the sealed chamber and add an oxygen-consuming gas thereto. The first mode is the most preferable and it is less costly. Regardless of the mode of preparing these assemblies it is preferable to heat them to working temperature and then work them by pressing or rolling to uniformly weld the surfaces and reduce the composite metal to usable gauge or dimension.

I claim:

1. The method of making a composite metal body of different metals which comprises the steps of mechanically cleaning by removing the surface of the attaching face of each of the metal components to provide a newly exposed cleaned molecular surface, stacking the newly exposed cleaned molecular surfaces of the different metal components in direct contact with each other to interlock their molecular structure and form a stacked composite body, sealing the metal components of the stacked composite body together around the perimeter thereof to completely enclose the cleaned and stacked surfaces from the atmosphere and maintain the cleaned molecular surfaces in contact with one another and to form a unitary body, exhausting air from between the enclosed cleaned molecular surfaces to produce a vacuum substantially 25.85 inches of mercury, sealing off the evacuated enclosure to prevent the access of oxidizing atmosphere to the cleaned molecular surfaces to be joined in forming the composite body, heating the sealed unitary body to a predetermined temperature to dilate the molecular structure of at least one of the composite parts, and subjecting the heated unitary body to working pressure to diffuse the cleaned molecular contacting surfaces together and form the composite body.

2. The method of making a composite metal body of different metals which comprises the steps of mechanically cleaning by the removal of the surface of the attaching face of each metal component to provide a newly exposed cleaned molecular surface, stacking the newly exposed cleaned molecular surfaces of the different metal components in direct contact with each other to form a stacked composite body, sealing the metal components of the stacked composite body together around the perimeter thereof to completely enclose the cleaned and stacked surfaces from the atmosphere and maintain the cleaned molecular surfaces in contact with one another and to form a unitary body, injecting inert gas to said enclosure, sealing off the enclosure to prevent the escape of the inert gas and the access of oxidizing atmosphere to the cleaned molecular surfaces to be joined in forming the composite body, heating the sealed unitary body to a predetermined temperature to dilate the molecular structure of at least one of the composite parts, and subjecting the heated unitary body to working pressure while the inert gas remains sealed therein to diffuse the mechanically cleaned molecular contacting surfaces together and form the composite body.

3. The method of making a composite metal body of different metals which comprises the steps of mechanically cleaning by the removal of the surface of the attaching face of each metal component to provide a newly exposed cleaned molecular surface, stacking the newly exposed cleaned molecular surfaces of the different metal components in direct contact with each other to interlock their molecular structure and form a stacked composite body, sealing the metal components of the stacked composite body together around the perimeter thereof to completely enclose the cleaned and stacked surfaces from the atmosphere and maintain the cleaned molecular surfaces in contact with one another and to form a unitary body, exhausting air from between the enclosed cleaned molecular surfaces to produce at least a partial vacuum therebetween, injecting an inert gas to said enclosure, sealing off the enclosure to prevent the escape of the inert gas and access of oxidizing atmosphere to the cleaned molecular surfaces to be joined in forming the composite body, heating the sealed unitary body to a predetermined temperature to dilate the molecular structure of at least one of the composite parts, and subjecting the heated unitary body to working pressure while the inert gas remains sealed therein to diffuse the cleaned molecular contacting surfaces together and form the composite body.

4. The method of making a composite metal body of different metals which comprises the steps of mechanically cleaning by removing the surface of the attaching face of each of the metal components to provide a newly exposed cleaned molecular surface, placing the newly exposed cleaned molecular surfaces of different metal components in direct contact with each other to interlock their molecular structure and form the composite metal body, exhausting air from between the cleaned molecular surfaces in contact with one another to produce a vacuum substantially 25.85 inches of mercury, heating the components with their surfaces in contact with each other to a predetermined temperature to dilate the molecular structure of at least one of the component parts, and subjecting the heated components to a working pressure while continuing said exhausting of the air to diffuse the cleaned molecular contacting surfaces together and form a unitary body.

5. The method of making a composite metal body of different metals which comprises the steps of mechanically cleaning by the removal of the surface of the attaching face of each metal component to provide a newly exposed cleaned molecular surface, placing the newly exposed cleaned molecular surface of the different metal components in direct contact with each other to interlock their molecular structure and form the composite metal body, applying an inert gas to between the cleaned molecular surfaces, heating the components with their cleaned molecular surfaces in contact with each other to a predetermined temperature to dilate the molecular structure of at least one of the component parts, and subjecting the heated components to a working pressure while the inert gas remains between the mechanically cleaned molecular contacting surfaces to diffuse them together and form a unitary body.

6. The method of making a composite metal body of different metals which comprises the steps of mechanically cleaning by the removal of the surface of the attaching face of each metal component to provide a newly exposed cleaned molecular surface, placing the newly exposed cleaned molecular surfaces of different metal components in direct contact with each other to interlock their molecular structure and form the composite metal body, exhausting air from between the cleaned molecular surfaces in contact with one another to produce a vacuum substantially 25.85 inches of mercury, applying an inert gas to between the cleaned molecular surfaces, heating the components with their surfaces in contact with each other to a predetermined temperature to dilate the molecular structure of at least one of the component parts, and subjecting the heated components to a working pressure while the inert gas remains between the cleaned molecular contacting surfaces to diffuse them together and form a unitary body.

References Cited in the file of this patent

UNITED STATES PATENTS

| Number | Name | Date |
| --- | --- | --- |
| 1,152,610 | De Bats | Sept. 7, 1915 |
| 1,886,615 | Johnson | Nov. 8, 1932 |
| 1,956,818 | Acre | May 1, 1934 |
| 2,059,584 | Johnson | Nov. 3, 1936 |
| 2,093,814 | Mann | Sept. 21, 1937 |
| 2,147,407 | Huston | Feb. 14, 1939 |
| 2,160,558 | Orr | May 30, 1939 |
| 2,414,511 | Dyar | Jan. 21, 1947 |
| 2,468,206 | Keene | Apr. 26, 1949 |
| 2,473,712 | Kinney | June 21, 1949 |
| 2,607,109 | Reynolds | Aug. 19, 1952 |
| 2,713,196 | Brown | July 19, 1955 |